United States Patent [19]
Jorgensen et al.

[11] Patent Number: 5,867,559
[45] Date of Patent: *Feb. 2, 1999

[54] REAL-TIME, ON-LINE, CALL VERIFICATION SYSTEM

[75] Inventors: Jacob W. Jorgensen, Teaneck, N.J.; Stephen D. Peavey, Wallingford; Donald Grailich, Bridgeport, both of Conn.; Andrew Heron, Reston, Va.

[73] Assignee: EIS International, Inc., Herndon, Va.

[*] Notice: This patent issued on a continued prosecution application filed under 37 CFR 1.53(d), and is subject to the twenty year patent term provisions of 35 U.S.C. 154(a)(2).

[21] Appl. No.: 603,231

[22] Filed: Feb. 20, 1996

[51] Int. Cl.$^6$ ...................................................... H04M 1/64
[52] U.S. Cl. ......................... 379/67; 379/88.13; 379/265
[58] Field of Search .................................. 379/67, 69, 88, 379/89, 265, 266, 309, 202, 88.07, 88.1, 88.13, 88.25, 88.28, 67.1; 381/80; 395/2.09, 2.91; 360/27, 31, 54; 370/498, 442; 704/200, 500

[56] References Cited

U.S. PATENT DOCUMENTS

| | | | |
|---|---|---|---|
| Re. 34,536 | 2/1994 | Frimmel | 379/88 |
| 3,045,068 | 1/1962 | Weingart et al. | 379/85 |
| 3,394,229 | 7/1968 | Miller et al. | |
| 3,989,899 | 11/1976 | Norwich | 379/134 |
| 4,599,493 | 7/1986 | Cave | 379/247 |
| 4,600,814 | 7/1986 | Cunniff et al. | 379/94 |
| 4,797,911 | 1/1989 | Szlam et al. | 379/67 |
| 4,805,209 | 2/1989 | Baker, Jr. et al. | 379/96 |
| 4,829,514 | 5/1989 | Frimmel, Jr. et al. | 379/89 X |
| 4,841,574 | 6/1989 | Pham et al. | 381/31 |
| 4,866,756 | 9/1989 | Crane et al. | 379/88 |
| 4,891,835 | 1/1990 | Leung et al. | 379/88 |
| 4,894,857 | 1/1990 | Szlam et al. | 379/67 |
| 5,003,574 | 3/1991 | Denq et al. | 379/75 |
| 5,033,088 | 7/1991 | Shipman | 379/88 X |
| 5,040,208 | 8/1991 | Jolissaint | 379/209 |
| 5,241,586 | 8/1993 | Wilson et al. | 379/88 |
| 5,297,195 | 3/1994 | Thorne et al. | 379/93 |
| 5,303,296 | 4/1994 | Zucker | 379/67 |
| 5,309,505 | 5/1994 | Szlam et al. | 379/88 |
| 5,325,290 | 6/1994 | Cauffman et al. | 379/112 X |
| 5,448,420 | 9/1995 | Henits et al. | 379/88 X |
| 5,533,103 | 7/1996 | Peavey et al. | 379/69 |

FOREIGN PATENT DOCUMENTS

| | | |
|---|---|---|
| 62-008651 | 1/1987 | Japan. |
| 63-067954 | 3/1988 | Japan. |
| 1-101770 | 4/1989 | Japan. |
| 4-035562 | 2/1992 | Japan. |
| 2256872 | 1/1993 | United Kingdom. |

Primary Examiner—Scott L. Weaver
Attorney, Agent, or Firm—Lane, Aitken & McCann

[57] ABSTRACT

In a call verification system, a telephone switch conference bridge couples the agent/client conversation to a multiprocessor sound-and-screen server, which digitally stores the agent-client conversation. When the agent completes inputting data to the client record, at least the updated portion of the client record is also coupled to the sound-and-screen server. The sound-and-screen server includes a data base manager that correlates storage of the client record with the conversation recording. In the verification operation, the sound and screen server operating in a multi-processing mode can fetch a conversation recording and the corresponding transaction record from memory while simultaneously recording new conversations and their associated records.

2 Claims, 4 Drawing Sheets

5,867,559

REAL-TIME, ON-LINE, CALL VERIFICATION SYSTEM

BACKGROUND OF THE INVENTION

1. Field of the Invention

This invention relates to an improved system for verifying agent entries to a client record in response to a telephonic communication from the client to the agent; a verification system which simultaneously displays the client record while the verifier listens to a recording of the client communication; and more particularly to a system that provides real-time, on-line verification.

2. Description of the Prior Art

As will be appreciated by those skilled in the art, call centers engaged in telemarketing, customer service, and other activities, often record at least a portion of the telephone conversation between an agent and the client. This recording allows verification of data inputted by the agent via the agent's terminal as a result of the conversation.

A widely used prior art approach to creating a recording for verification of the conversation, provides each agent a voice recorder and a switch, which allows the agent to turn on the voice recorder to start recording a conversation and to turn it off when the agent is finished recording. Analog records were initially used; e.g. reel to reel tape recorders. More recently, digital recorders have been used. While digital recording provides potentially easier access to a particular voice record, these prior art systems do not automatically correlate the voice recording with data inputted by the agent as a result of the conversation.

U.S. patent application Ser. No. 08/234,484 filed Apr. 28, 1994 now U.S. Pat. No. 5,533,103, and assigned to the assignee of this application, discloses an improved prior art system in which the digitally stored voice record is automatically correlated with the agent's input to the client record. While this prior art system is a significant advance in the art, it does not provide for real-time, on-line verification of a transaction. That is, provision for verification immediately after the agent has completed inputting data to the client record, and verification while contemporaneously recording verification information for other calls.

SUMMARY OF THE INVENTION

An object of this invention is the provision of a call transaction verification system in which the voice record and the transaction are automatically correlated in a data base with the correlated record available in real-time for on-line verification while contemporaneously recording additional calls.

Briefly, this invention contemplates the provision of a call verification system in which a telephone switch conference bridge couples the agent/client conversation to a multi-processor sound-and-screen server, which digitally stores the agent-client conversation. When the agent completes inputting data to the client record, at least the updated portion of the client record is also coupled to the sound-and-screen server. The sound-and-screen server includes a data base manager that correlates storage of the client record with the conversation recording.

In the verification operation, the sound and screen server operating in a multi-processing mode can fetch a conversation recording and the corresponding transaction record from memory while simultaneously recording new conversations and their associated records. The sound and screen server converts the digital conversation recording to an analogue audio signal and couples it to the headset of an agent at a verification terminal, and simultaneously displays the transaction record on the video screen at the verification terminal.

In a preferred embodiment of the invention, a standard T1 interface and T1 link are used to couple the telephone switch to the sound and screen server, although other suitable links could be used, such as E-1, PR1, BR1 or an analogue link. The T1 interface provides analog to digital conversion of the voice signal and time-division multiplexing of up to twenty four-voice channels. Also in the preferred embodiment, an agent, via the verification terminal, can alter the transaction record so that it corresponds to the audio recording, and this altered record is used to correct the host processor record.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
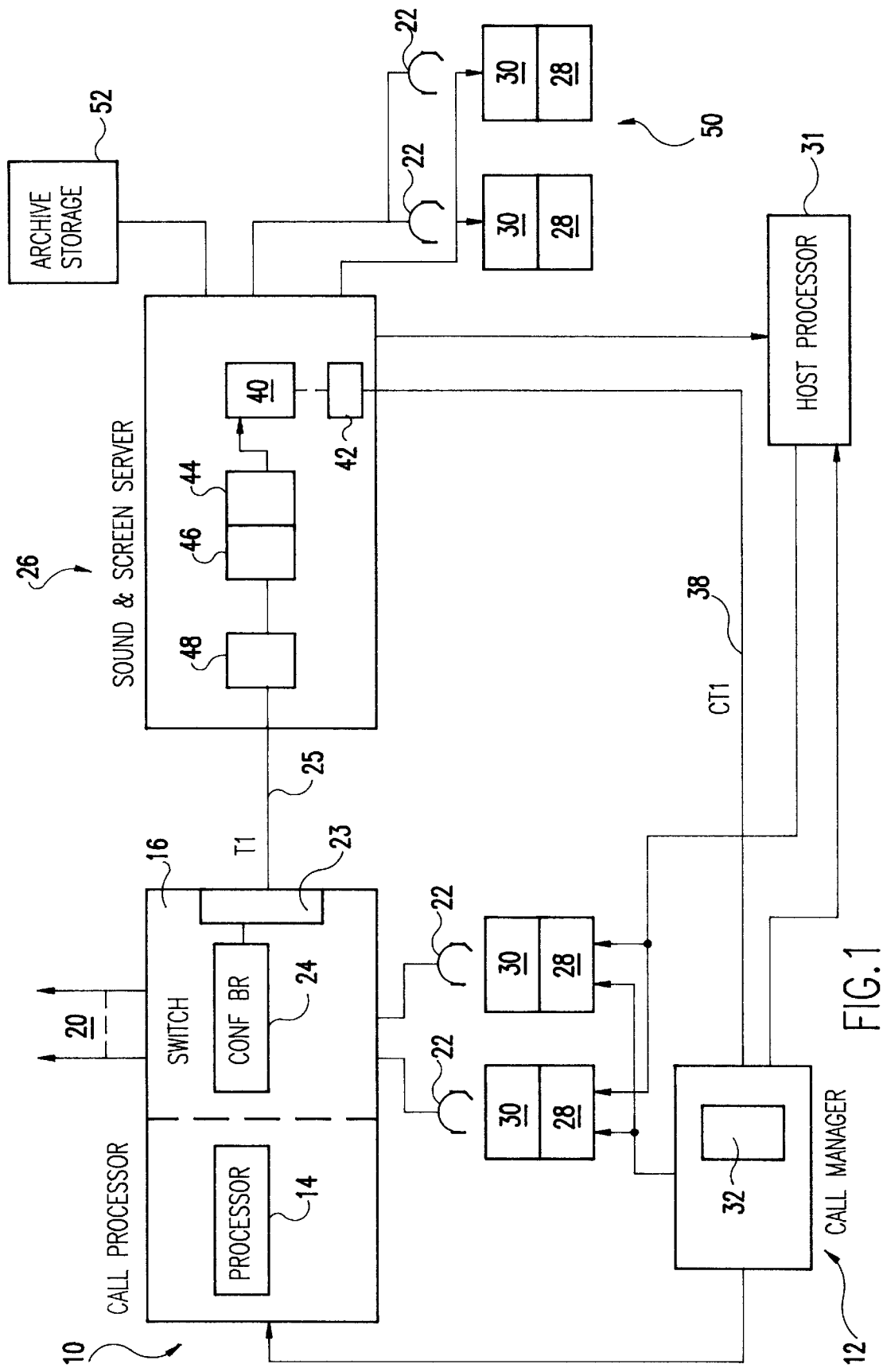
FIG. 1 is a functional block diagram of a real-time, on-line verification system in accordance with the teachings of this invention used in conjunction with an outbound dialer system.

Referring now to FIG. 1, as will be appreciated by those skilled in the art, the basic components of the outbound dialer shown there are illustrative of outbound dialer systems commercially available from applicants' assignee and from others.

This illustrative outbound dialer system includes what is referred to in the art as a call processor function 10 and a call manager function 12. As the name implies, the call processor function 10 comprises hardware and software for the functions of dialing calls and call switching. The call manager function is primarily an application running on a processor that manages the operation, including calls to dial, call pacing, and data transfer to and from the agent. The call processor function 10, in this illustrative example, has two major sub-components, a computer processor 14 and a telephone switch 16. The computer processor 14 is programmed to receive and interpret commands from the call manager 12. In response to these commands, the processor 14 controls the operation of the telephone switch 16 and also monitors the status of calls and reports the status to the call manager 12. The telephone switch 16 connects completed calls on trunks 20 to a head set 22 of an available agent. In addition, in accordance with the teachings of this invention, the telephone switch 16 includes a telephone conference bridge 24, which on command, connects a call in progress via T1 interface 23 and T1 link 25 to a sound and screen server 26, in order to make a recording of the call for the purpose of verification. Each agent station has, in addition to a headset 22, a data entry terminal 28 and a display screen 30, both connected to the call manager 12.

In a typical outbound call system, telephone numbers to be called along with partial client records of the clients to be called are loaded from a host computer 31 to the call manager 12 where they are stored in, for example, disk store 32. The numbers of the parties to be called are transferred from the call manager 12 to the computer processor 14. The computer processor 14 activates the switch 16 to seize a trunk 20, and dials a number. When the computer processor 14 detects that call has been answered, it again activates the switch 16 to connect the call to the headset 22 of an available agent, and transmits a message to the call manager 12 identifying the called party and the agent to which the call has been connected. The call manager, in response to this message transmits a partial client record to the terminal display 30 of the agent to which the call has been connected, and fetches the complete record from the host computer 31. The complete record may be transferred directly from the host to the display screen of the agent.

The agent, in response the conversation between the agent and the client, will make entries to the client record via agent data entry terminal 28. In order to record the part of the conversation related to the agent's entries to the client record, the agent may push an appropriate function key on the data entry terminal. This generates a recording command, which is transmitted to the call manager 12. It will be appreciated that alternatively, the recording command can be generated automatically. For example, in response to a certain portion of the script being displayed on the display screen, or the agent reaching a certain portion of the script, or voice activated by the agent speaking a key word or phrase from the script.

The call manager 12, in response to the recording command, issues an instruction to the computer processor 14, which interprets the instruction, and causes the switch 16 to establish a conference bridge 24 connecting the client-agent telephone connection specified by the call manager to the sound and screen server 26, via a T1 interface 23 and a T1 link 25. The call manager 14 transmits a file identifier message to the sound and screen server 26, via a standard computer/telephone interface (CTI) link 38, to establish a file identifier for the incoming digital voice data stream on T1 link 25 at a particular sound and screen input port assigned by the sound and screen server.

The sound and screen server 26 has a large, digital memory 40 capable of accepting digital data at high input rates, such as for example, a high-speed disk memory with a multi-giga byte storage capacity. In this embodiment, a smaller, high speed memory 42 is used to store that part of a customer record needed for the verification process. It will be appreciated that, if desired, a single physical memory could be used to store both the voice and data records used for verification.

Figure 2:
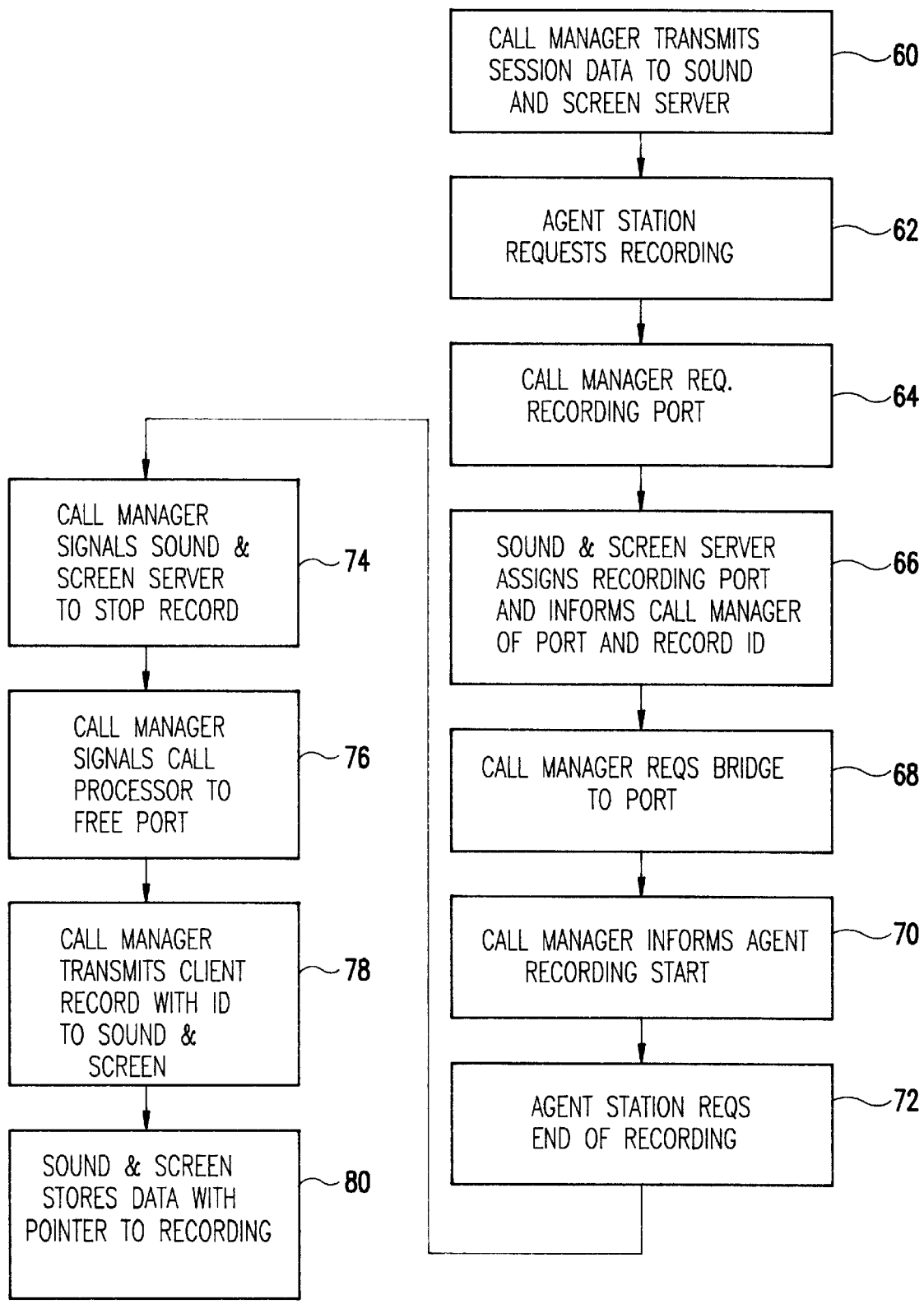
FIG. 2 is a flow diagram of the operation of the real-time, on-line verification system shown in FIG. 1.

Referring now to FIG. 2, the sound and screen server 26 includes processor hardware 44 running a multi-processing operating system 45, such as COS UNIX, a data base management application 46, and a digital signal processor 48. The incoming digital voice data stream on T1 link 25 is compressed by the digital signal processor 48, and stored in memory 40 at an address location established by the data base manager application 46 with the file identifier pointing to this address. The file identifier may include, for example, client identification, agent identification, call campaign identification, and/or time and date identification.

In response to the conversation between the agent and the client, which has been recorded, the agent may make, via agent terminal 28, one or more entries in the client record. When these entries are completed by the agent (e.g. signaled by the agent with terminal key entry) the call manager 12 transmits the updated client record data to the sound and screen server 26 via CTI link 38 along with the voice recording identifier or an identifier keyed to that identifier. The server processor 44, in combination with the data base manager 46 stores the updated client record data in the memory 42 with a pointer to the corresponding voice record in memory 40. The call manager 12 also transmits the updated client record data to the host processor 31.

As will be appreciated by those skilled in the art, the T1 interface 23 and the T1 link 25 are commercially available products, which provide analogue to digital conversion of the voice and are capable of transmitting, on a time division multiplex basis, 24 calls. While only one T1 link is illustrated, as many T1 links as needed may be used in the actual implementation of the invention.

Verification stations indicated by the general reference number 50 are connected to the sound and screen server 26. Each verification station 50 has an operator headset 22, a display screen 30, and an input terminal 28, the same station apparatus as the agent stations. The agent stations may serve as verification stations with the proper connections and function switches.

The verification process can be an on-line operation. That is, a client record entry can be verified by simultaneously displaying the record entry and listening to the voice recording which resulted in the record entry any time after the agent completes the update of the client record. In the verification operation, the sound and screen server processor 44 connects the digital recording of the conversation stored in the memory 40 to the headset 22 of a verification agent via a digital signal processor 48, which converts the stored digital signal to an audio signal. Here it should be noted, the commercially available compression/decompression modules can recreate the original audio signal from the compressed digital signal, or, if desired, can recreate a speech compressed version of the original audio signal so the elapsed time needed to listen to the conversation is less than the length of the original conversation. At the same time, the processor 44 couples the updated customer record stored in memory 42 to the display terminal 30 of the verification agent. The verification agent can enter, via keyboard 28, a verification code, if the updated client record on the display screen, as entered by the agent, is in accordance with the voice recording. The verification code is transmitted to the sound and screen server where it is entered in the stored voice and/or data records and is also transmitted to the host computer 31, where it is entered in the data record.

If the updated client record displayed on the screen at the verification station is inconsistent with the voice recording of the transaction, the validation agent may insert a code marking the record invalid, which code is stored with the record in the sound and screen server and the host computer in the same manner as a record valid code. In a preferred embodiment of the invention, the validation agent can correct the client record via keyed inputs from the verification agent terminal. The corrected record is then transmitted to the sound and screen server where it is stored with a validation code, replacing the originally stored client record. The sound and screen server transmits the corrected, updated client record to the host, where it replaces the originally updated portion of the client record.

One (or more) of the validation stations is preferably programed as a supervisory station. A verification agent at a supervisory station enters commands to the sound and screen server to control the down loading of records to the verification stations. For example, an input from the supervisor station can command the sound and screen server to down load records for a particular campaign to the verification stations in order of time sequence of record receipt as each station becomes available after completing a previous verification.

As will be appreciated by those skilled in the art, even with data compression, the voice records occupy a large amount of memory space. Periodically, the sound and screen voice and client update records are transferred to archival storage 52, such as a tape storage. In a typical call center application, the sound and screen records are transfer to archival storage about once a day or once every two days.

Referring now to FIG. 2, in an operation to record voice data, the call manager 12 transmits, for each calling session, identifying data to the sound and screen server 26 over link 38, as indicated in block 60. When an agent station (e.g. via keyboard 28) requests commencement of conversation recording (block 62), the call manager 12 requests of the sound and screen server 26 the assignment of a recording port, block 64. The sound and screen server assigns a recording port and informs the call manager of the assigned port along with the record identifier to be assigned the recording, block 66. In block 68, the call manager requests the call processor to establish a conference bridge between the call and the assigned port.

The call manager 12 informs the agent (e.g. via agent display 30) that recording of the conversation has commenced. The sound and screen processor records, in high speed storage 40, the conversation until the agent requests an end to the recording process, block 72. In response to this agent input, the call manager 12 signals the sound and screen server 12 to stop recording, block 74, and the call manager signals the call processor 10 to free the assigned port, block 76.

When the agent signals that he has completed inputting data to the client record, the call manager transmits the client record to the sound and screen server 26 along with the record ID assigned in block 66. The sound and screen server stores the data with a pointer pointing to the recording of the corresponding voice record.

Figure 3:
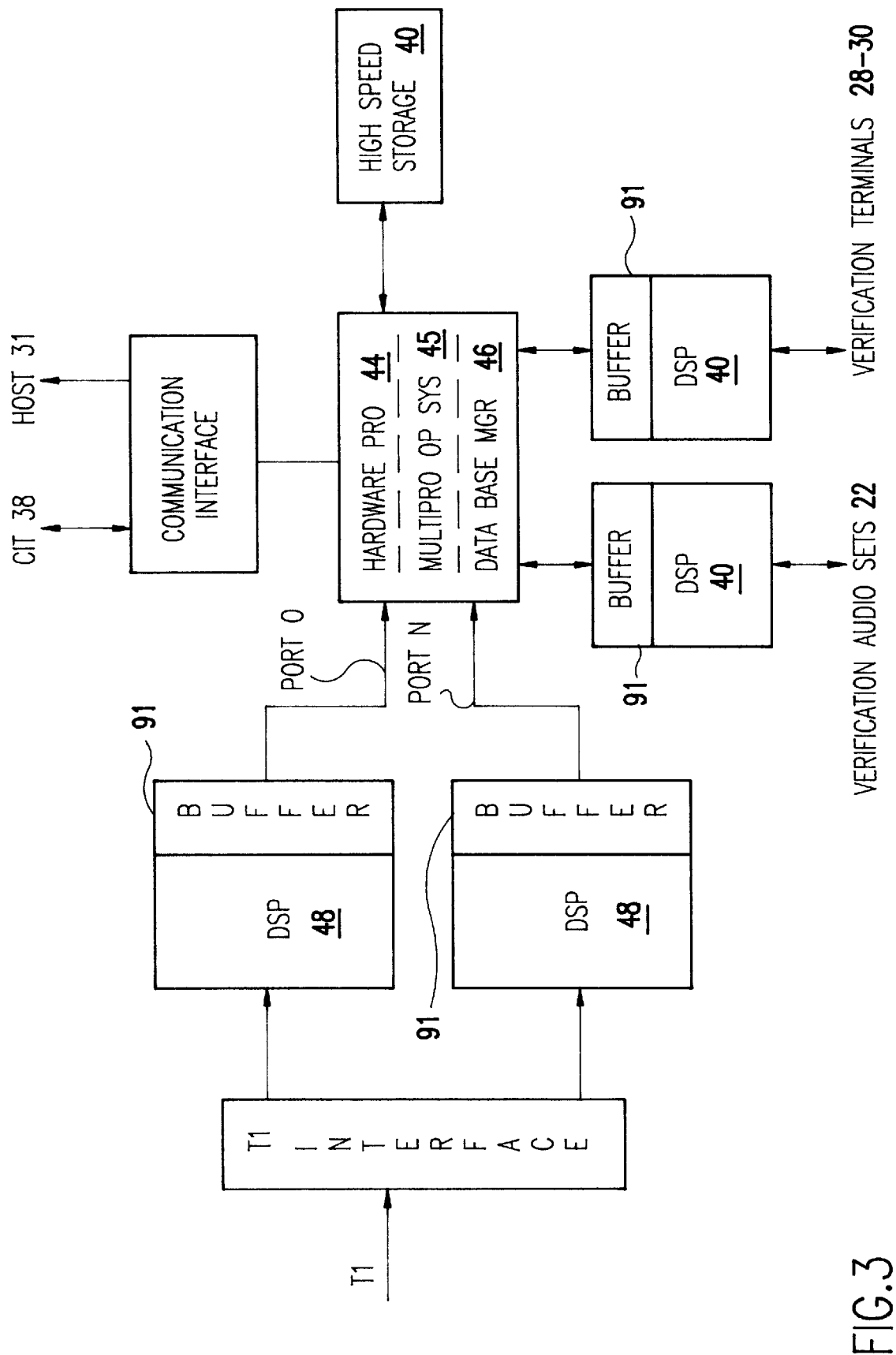
FIG. 3 is a functional block diagram of one embodiment of a sound and screen server function in accordance with the teachings of this invention.

Referring now to FIG. 3, in accordance with the teachings of this invention, the sound and screen server is set up to record a number of simultaneous conversations, associate with the conversations the appropriate customer data records, and contemporaneously to fetch a number of previously recorded conversations with their data records from storage for the purpose of verification. To this end, the hardware processor 44 uses a multi-processing operating system 45, such as, for example, the COS UNIX operating system. The time division multiplexed, digital voice signals for a number of simultaneous calls (up to 24 for each T1 line) are coupled to one of a plurality of digital signal processors (DSP) 48, each of which includes a buffer store 91 for storing incoming digital data after it has been formatted and compressed by the DSP. For example, one second of digital data is stored in each buffer 91. Suitable DSPs, with data compression, are commercially available from Natural Microsystems Inc. and others. Other DSPs 48, with buffers 91, couple voice and data record fetched high speed storage 40 to the verification stations. In this operation, the DSPs perform a digital-to-analogue conversion of the voice recording. The multi-processor 45 operating services each incoming request for service from a DSP 48 as an interrupt in a preferred embodiment of the invention.

Figure 4:
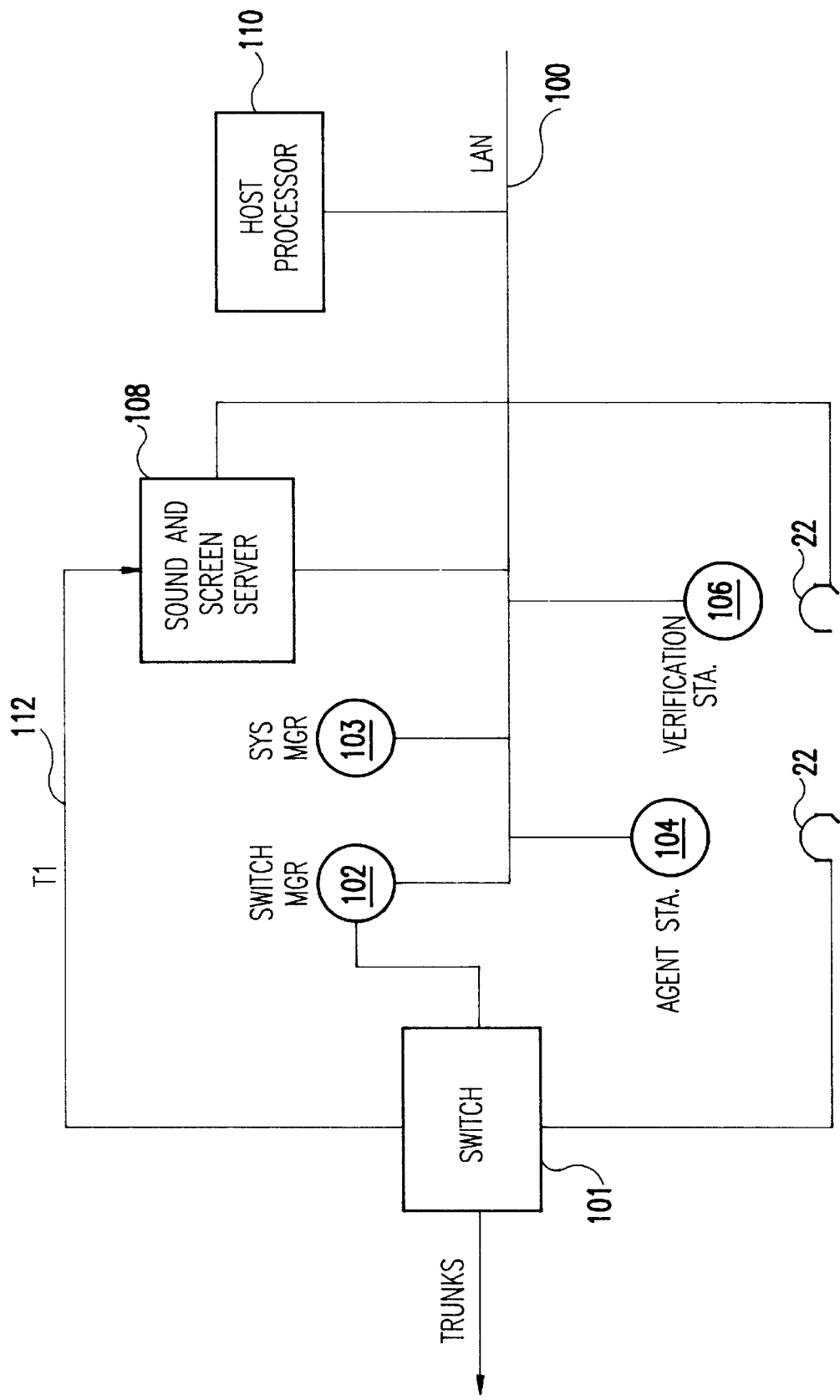
FIG. 4 is a functional block diagram of an embodiment of a verification system in accordance with the teachings of this invention used in conjunction with a call center system that may be inbound only, outbound only, or inbound/outbound combined.

FIG. 4 illustrates how the invention is applicable to call center operations generally. That is, inbound only call centers, outbound only call centers, and call centers capable of inbound and outbound operations. This system architecture can have virtually any number of servers and stations interconnected via a local network 100 such as, for example, an Ethernet TCP/IP LAN. As illustrated here, a telephone switch 101 is controlled by a switch resource manager 102 the operation of which is, in turn, controlled by a systems manager 103. In this architecture, the LAN 100 couples agent stations 104 and verification stations 106 to the system. Finally, connected to the LAN 100 are a sound and screen server 108 and a host processor 110. A T1 link 112 couples the voice record from the switch 101 to the sound screen server 108. T1 link 112 is interfaced to the switch 101 and the sound and screen server 108 in the same way as T1 link 25 shown and described in connection with FIG. 1. The head sets 22 at the agent stations and at the verification stations can be connected to the switch 101 and the sound and screen server 108, respectively, in the same manner as shown and described in connection with FIG. 1. Here it will be appreciated that the operation of the system with respect to verification is the same irrespective of whether the system architecture supports inbound only, outbound only or inbound/outbound operation. In the operation to record the voice data, the systems manager 103 transmits for each session identifying data to the sound and screen server 108 over LAN 100. When an agent station (e.g. via keyboard 28) requests recording of a conversation to start the systems manager 103 requests of the sound and screen server 108 the assignment of a recording port. The sound and screen server assigns a recording port and informs the systems manager 103 of the assigned port and a record identifier to be assigned the recording. The systems manager requests the switch manager to establish a conference branch in the switch 101 between the call and the assigned port.

The systems manager 103 informs the agent (e.g. via agent display 30) that recording of the conversation has commenced. The sound and screen server 108 records in high speed storage the conversation until the agent requests an end to the recording process. In response to the agent input, the systems manager 103 signals the sound and screen server 108 to stop recording, and the systems manager signals the switch manager to free the assigned port. When the agent signals that he has completed inputting data to the client record, the systems manager transmits the client record to the sound and screen server 108 along with the assigned record ID. The sound and screen server stores the data with a pointer pointing to the recording of the corresponding voice record.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An on-line, real-time, system for comparing agent inputs to client records with client responses to verbal communications between the client and an agent immediately upon completion of a data record in response to said agent inputs and a voice record of said verbal communications, comprising in combination:

a plurality of agent stations, each of said agent stations including an agent telephonic communication means for the verbal communications between said agent and said client and a data input terminal means for inputting data to the client record in response to the verbal communications between said agent and said client;

telephone switching means;

a plurality of telephone trunks connected to said telephone switching means;

said telephone switching means for establishing a plurality of communications channels connecting respective ones of said plurality of telephone trunks to ones of said agent telephonic communication means;

a multi-processing server and a digital data storage means connected to said multi-processing server;

means responsive to agent inputs for simultaneously connecting a plurality of said communications channels to said multi-processing server;

said multi-processing server connected to and operating a database manager means for generating a plurality of record files for respectively storing a plurality of voice records generated from the verbal communications on said plurality of communications channels;

said means for simultaneously connecting including means for digitizing said voice records and for compressing said digitized voice records;

said multi-processing server simultaneously storing a plurality of the digitized and compressed voice records in said digital data storage means in respective ones of said record files;

means for coupling a plurality of said data input terminal means to said multi-processing server, said multi-processing server simultaneously storing the digital data in said digital data storage means from each of a plurality of data input terminal means at an agent station contemporaneously with and associated with the voice record from said agent station;

said multi-processing server coupling, via data decompression means and digital-to-analog conversion means, said data record and said voice record from the record file in said digital data storage means immediately after said data record and voice record have been completed, to a verification station for comparison of said voice record with said data record, while at the same time continuing to simultaneously store other ones of said plurality of the digitized and compressed voice records in said digital data storage means and storing the digital data in said digital data storage means from each of said plurality of data input terminal means;

said verification station including means to play said voice record and to display said data record.

2. An on-line real time system as in claim 1 wherein said telephone switching means includes a conference bridge and said means responsive to agent inputs for simultaneously connecting a plurality of said communications channels to said multi-processing server includes said conference bridge and a time division multiplexed communication link.

* * * * *